(12) United States Patent
Chen et al.

(10) Patent No.: US 9,627,992 B2
(45) Date of Patent: Apr. 18, 2017

(54) CONTROLLING CIRCUIT AND AC/DC CONVERTER THEREOF

(71) Applicant: Silergy Semiconductor Technology (Hangzhou) LTD, Hangzhou, ZheJiang Province (CN)

(72) Inventors: Wei Chen, Saratoga, CA (US); Xiaoru Xu, Hangzhou (CN); Qiukai Huang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 126 days.

(21) Appl. No.: 14/249,166

(22) Filed: Apr. 9, 2014

(65) Prior Publication Data

US 2014/0313786 A1  Oct. 23, 2014

(30) Foreign Application Priority Data

Apr. 19, 2013 (CN) .......................... 2013 1 0138826

(51) Int. Cl.
| | |
|---|---|
| H02M 3/335 | (2006.01) |
| H02M 7/217 | (2006.01) |
| H02M 1/42 | (2007.01) |
| H05B 33/08 | (2006.01) |
| H02M 1/00 | (2006.01) |

(52) U.S. Cl.
CPC ......... H02M 7/217 (2013.01); H02M 1/4258 (2013.01); H02M 1/4266 (2013.01); H05B 33/0815 (2013.01); H02M 2001/0025 (2013.01); Y02B 70/126 (2013.01)

(58) Field of Classification Search
CPC ......... H02M 3/33507; H02M 3/33523; H02M 3/335; H02M 3/33561; H02M 3/157; H02M 3/1584; H02M 3/33592; H02M 1/32; H02M 1/4208; H02M 1/081; H02M 2001/0032; H02M 5/4585; H02M 7/493; H02M 7/53871; H02M 7/155; H02M 7/1557; H02M 7/06; H02M 7/068; H02M 7/10; H02M 7/217; H02M 7/219
USPC ... 363/21.12, 21.15, 21.18, 78, 86, 125–127
See application file for complete search history.

(56) References Cited

U.S. PATENT DOCUMENTS

| | | | |
|---|---|---|---|
| 4,412,277 A | 10/1983 | Mitchell | |
| 7,447,049 B2 * | 11/2008 | Garner | H02M 3/33523 363/21.12 |
| 8,279,631 B2 * | 10/2012 | Yang | H02J 7/0072 363/20 |
| 8,300,438 B1 | 10/2012 | Herbert | |

(Continued)

Primary Examiner — Jue Zhang
Assistant Examiner — Kevin H Sprenger
(74) Attorney, Agent, or Firm — Michael C. Stephens, Jr.

(57) ABSTRACT

In one embodiment, a controlling circuit configured for an AC/DC converter that receives an AC voltage supply, can include: (i) a compensation signal generator configured to generate a compensation signal that follows an error between an output signal from the AC/DC converter and an expected converter output signal during a first time interval of a half period of the AC voltage supply, the compensation signal being substantially constant during a remaining time interval of the half period; and (ii) a controlling signal generator configured to generate a controlling signal based on the compensation signal to maintain the output signal as substantially consistent with the expected converter output signal.

10 Claims, 6 Drawing Sheets

(56) References Cited

U.S. PATENT DOCUMENTS

| | | | |
|---|---|---|---|
| 2011/0044076 A1* | 2/2011 | Zhang | H02M 3/33507 363/21.17 |
| 2011/0149612 A1* | 6/2011 | Yeh | H02M 3/33507 363/21.09 |
| 2011/0298305 A1* | 12/2011 | Chisenga | H02M 3/156 307/151 |
| 2012/0020119 A1 | 1/2012 | Tang et al. | |
| 2012/0075891 A1* | 3/2012 | Zhang | H02M 3/335 363/21.18 |
| 2013/0135775 A1* | 5/2013 | Yao | H02H 9/025 361/18 |
| 2013/0148396 A1* | 6/2013 | Walters | H02M 1/4225 363/126 |
| 2013/0301309 A1 | 11/2013 | Chen | |
| 2013/0329463 A1 | 12/2013 | Chen | |
| 2014/0078789 A1* | 3/2014 | Li | H02M 3/33523 363/21.15 |
| 2014/0301116 A1* | 10/2014 | Zhang | H02M 3/33515 363/21.15 |

* cited by examiner

US 9,627,992 B2

CONTROLLING CIRCUIT AND AC/DC CONVERTER THEREOF

RELATED APPLICATIONS

This application claims the benefit of Chinese Patent Application No. 201310138826.X, filed on Apr. 19, 2013, which is incorporated herein by reference in its entirety.

FIELD OF THE INVENTION

The present invention relates to the field of power supplies, and more particularly to a controlling circuit and an associated AC/DC converter.

BACKGROUND

A "switched-mode power supply (SMPS), or a "switching" power supply, can efficiently convert electrical power from a source to a load, or to several different loads, with each corresponding to a different output. The main transistor of a switching-mode supply can switch between on and off states at a given operating frequency, and voltage regulation can be achieved by varying the ratio of the on-to-off time of the main transistor. Switch mode power supplies may have relatively high power conversion efficiency, as compared to other types of power converters. Switch mode power supplies may also be substantially smaller and lighter than a linear supply due to the smaller transformer size and weight.

SUMMARY

In one embodiment, a controlling circuit configured for an AC/DC converter that receives an AC voltage supply, can include: (i) a compensation signal generator configured to generate a compensation signal that follows an error between an output signal from the AC/DC converter and an expected converter output signal during a first time interval of a half period of the AC voltage supply, the compensation signal being substantially constant during a remaining time interval of the half period; and (ii) a controlling signal generator configured to generate a controlling signal based on the compensation signal to maintain the output signal as substantially consistent with the expected converter output signal.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
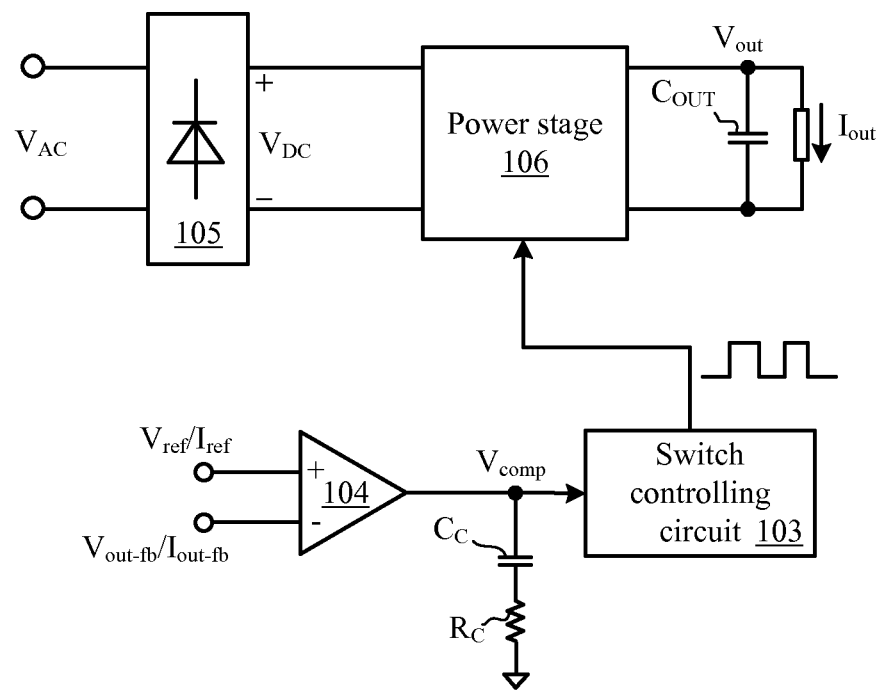
FIG. 1 is a schematic block diagram of an example AC/DC converter with power factor correction.

Referring now to FIG. 1, shown is a schematic block diagram of an example AC/DC converter with power factor correction. In view that the system may not be fully linear, additional harmonics of the output signal can be generated as compared with the input signal, which is defined as total harmonic distortion (THD), and may be indicated by a certain percentage. For some AC/DC converters, power factor correction (PFC) can be employed to increase the power factor to make a waveform of input current follow that of the AC input voltage. However, THD may still not be decreased efficiently in some cases. In the example of FIG. 1, the AC/DC converter can generally include power stage 106, an output filter (e.g., including output capacitor $C_{OUT}$), and switch controlling circuit 103. Power stage 106, which may include at least one power switch (e.g., transistor), can be configured in any suitable converter topology (e.g., buck, boost, flyback, etc.).

External AC voltage $V_{AC}$ can be rectified by rectifier bridge 105 to generate DC input voltage $V_{DC}$ as the supply voltage of power stage 106. The power switch in power stage 106 can be configured to coupled or decouple DC input voltage $V_{DC}$ to the load at the output of the AC/DC converter. The output filter can be coupled between DC input voltage $V_{DC}$ and the load in order to filter the output signal of the power switch to provide output voltage $V_{out}$ and/or output current $I_{out}$. Switch controlling circuit 103 (e.g., pulse-width modulator [PWM], pulse frequency modulator, etc.) can be configured to generate a controlling signal (e.g., a square wave) to control on and off status of the power switch such that the output signal of the AC/DC converter can maintain output voltage $V_{out}$ and/or output current $I_{out}$ as substantially constant.

In order to achieve constant voltage or constant current control, an error (e.g., an error signal indicating a voltage or a current difference) between the sampled present output voltage $V_{out}$ or output current $I_{out}$ and corresponding expected output voltage $V_{ref}$ or expected output current $I_{ref}$, respectively, can be calculated by error operation amplifier 104 to generate an error signal. This error signal can be compensated by a compensation circuit (e.g., including resistor $R_C$ and capacitor $C_C$) in order to generate compensation signal $V_{comp}$. A controlling signal (e.g., a square wave) can be generated based on compensation signal $V_{comp}$ by switch controlling circuit 103. For example, a duty cycle of the controlling signal can be determined by compensation signal $V_{comp}$. In this way, output voltage $V_{out}$ and/or output current $I_{out}$ can be maintained substantially consistent with corresponding expected output voltage $V_{ref}$ or expected output current $I_{ref}$.

However, compensation signal $V_{comp}$ may vary along with DC input voltage $V_{DC}$ in this type of implementation. Because DC input voltage $V_{DC}$ may be shaped as a half-sinusoidal wave signal, compensation signal $V_{comp}$ may significantly fluctuate, thus possibly increasing the THD of the AC/DC converter. As a result, the power factor correction performance may be weakened, and can essentially pollute the power grid.

In one embodiment, a controlling circuit configured for an AC/DC converter that receives an AC voltage supply, can include: (i) a compensation signal generator configured to generate a compensation signal that follows an error between an output signal from the AC/DC converter and an expected converter output signal during a first time interval of a half period of the AC voltage supply, the compensation signal being substantially constant during a remaining time interval of the half period; and (ii) a controlling signal generator configured to generate a controlling signal based on the compensation signal to maintain the output signal as substantially consistent with the expected converter output signal.

Figure 2:
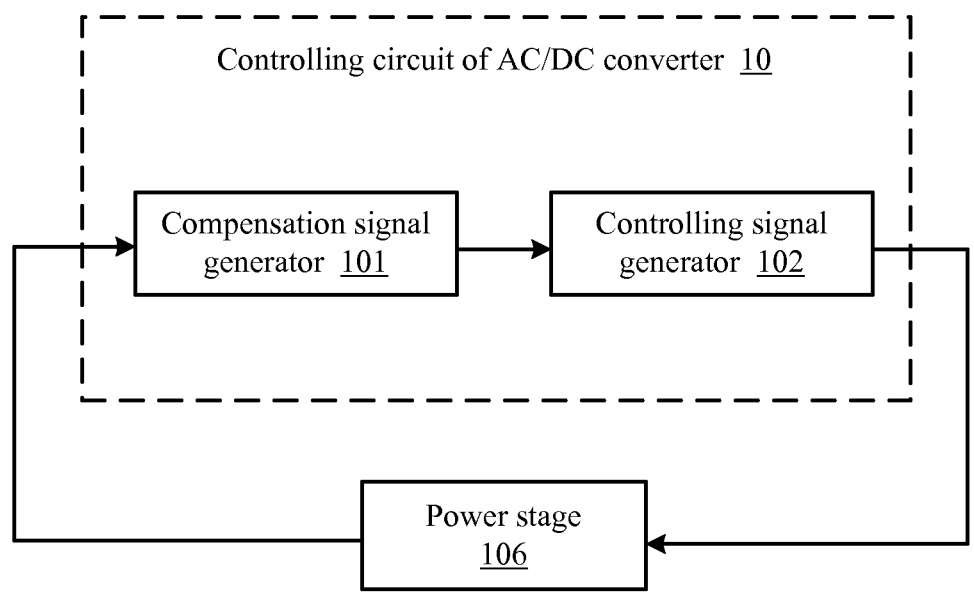
FIG. 2 is a schematic block diagram of an example controlling circuit of an AC/DC converter, in accordance with embodiments of the present invention.

Referring now to FIG. 2, shown is a schematic block diagram of an example controlling circuit of an AC/DC converter, in accordance with embodiments of the present invention. For example, controlling circuit 10 can be coupled to a power stage as part of an AC/DC converter. In this case, controlling circuit 10 can include compensation signal generator 101 and controlling signal generator 102.

Compensation signal generator 101 can generate a compensation signal based on an output signal (e.g., output voltage, output current, etc.) of power stage 106 and an expected converter output signal. The compensation signal can then be provided to controlling signal generator 102 for determining control of power stage 106. In particular embodiments, based on a period, or portion of (e.g., half) the period, of the AC voltage supply of the AC/DC converter, the compensation signal can follow an error between the output signal of the power stage and an expected converter output signal, during a first time interval of a half period. In addition, the compensation signal can remain substantially constant during a remaining time interval of the half period of the AC voltage supply. Also in particular embodiments, other time intervals or durations can be utilized to control power stage 106. For example, time intervals other than a half period of the AC or DC voltage supply, such as a quarter period, a third of a period, etc., can also be supported in certain embodiments.

Controlling signal generator 102 can be coupled to compensation signal generator 101, and may generate a controlling signal (e.g., to control a transistor in power stage 106) based on the compensation signal. The controlling signal can be provided to power stage 106 to control the output signal (e.g., voltage, current, etc.) to be substantially consistent with the expected converter output signal. For example, controlling signal generator 102 can include PWM or pulse frequency modulation type of control, and power stage 106 can include a transistor having a gate coupled to the controlling signal. In this way, the output signal can be regulated to be substantially consistent with the expected converter output signal (e.g., a reference voltage, a reference current, etc.).

Figure 3:
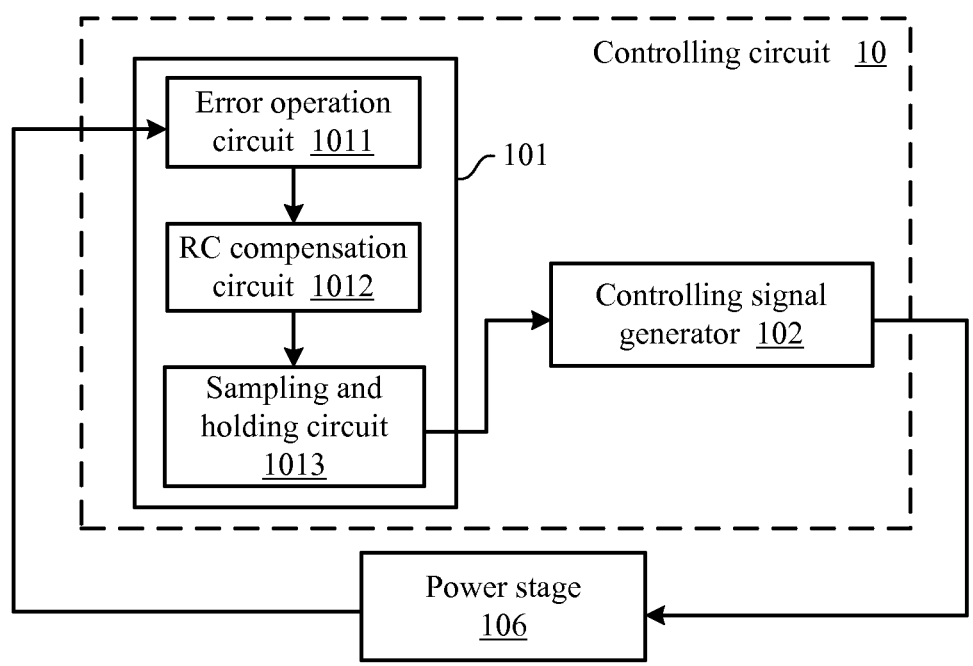
FIG. 3 is a schematic block diagram of an example compensation signal generator of the controlling circuit of the AC/DC converter example of FIG. 2, in accordance with embodiments of the present invention.

Referring now to FIG. 3, shown is a schematic block diagram of an example compensation signal generator of the controlling circuit of the AC/DC converter example of FIG. 2, in accordance with embodiments of the present invention. In this example, compensation signal generator 101 can include error operation circuit 1011, RC compensation circuit 1012, and sampling and holding circuit 1013. Error operation circuit 1011 can be coupled to power stage 106 and RC compensation circuit 1012, and may generate an error signal based on a comparison of an output signal of power stage 106 against an expected converter output signal.

RC compensation circuit 1012 can be coupled to error operation circuit 1011 and sampling and holding circuit 1013, and may generate an operational signal by compensating the error signal from error operation circuit 1011. Sampling and holding circuit 1013 can receive the operational signal, and may generate a compensation signal for controlling signal generator 102. In particular embodiments, the compensation signal can remain consistent with the operational signal during the first time interval or half period portion of the AC voltage supply, while the compensation signal can maintain (during the remaining time interval of the half period) a same constant value of the operational signal that occurred at the end of the first time interval.

Figure 4:
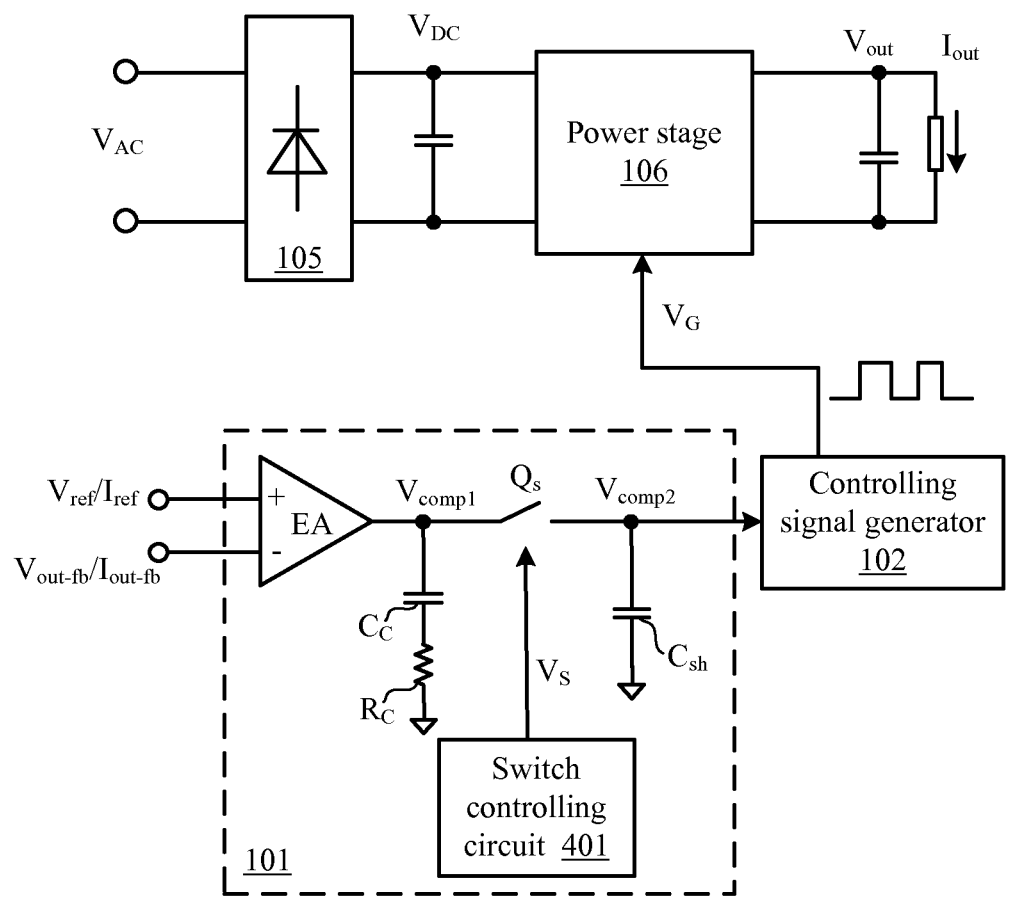
FIG. 4 is a schematic block diagram of an example controlling circuit of an AC/DC converter, in accordance with embodiments of the present invention.

Referring now to FIG. 4, shown is a schematic block diagram of an example controlling circuit of an AC/DC converter, in accordance with embodiments of the present invention. In this example, error operational circuit 1011 can include error (e.g., operational) amplifier EA, which can receive an output signal of power stage 103 (e.g., output current $I_{out\text{-}fb}$, or output voltage $V_{out\text{-}fb}$) and the expected converter output signal (e.g., corresponding expected output current $I_{ref}$ or expected output voltage $V_{ref}$), and may generate error signal $V_{error}$ at its output. RC compensation circuit 1012 can include compensation resistor $R_C$ and compensation capacitor $C_C$ coupled in series between the output of amplifier EA and ground, and may be configured to compensate error signal $V_{error}$. The signal at a common node of compensation capacitor $C_C$ and the output amplifier EA can thus be configured as operational signal $V_{comp1}$.

Sampling and holding circuit 1013 can include controllable switch (e.g., a transistor) $Q_s$ coupled to RC compensation circuit 1012, and charging capacitor $C_{sh}$ coupled to controllable switch $Q_s$. A voltage across charging capacitor $C_{sh}$ can be configured as compensation signal $V_{comp2}$. Furthermore, sampling and holding circuit 1013 can also include switch controlling circuit 401 coupled to controllable switch $Q_s$ to generate switch controlling signal $V_S$ based on the period (e.g., time interval therein) of the AC voltage supply (or DC input voltage) in order to control on and off states of controllable switch $Q_s$.

An example signal transmission of particular embodiments will be described in more detail below. AC voltage supply can be rectified by rectifier bridge 105 in order to generate DC input voltage $V_{DC}$ as a half-sinusoidal wave. Power stage 106 can receive DC input voltage $V_{DC}$ as the half-sinusoidal wave, and may generate output voltage $V_{out}$ and/or output current $I_{out}$ at the output of the AC/DC converter. Also, switch controlling circuit 401 can be configured to generate switch controlling signal $V_S$ in accordance with the period (e.g., cycle) or particular time interval within the period of the AC voltage supply $V_{AC}$ in order to control on and off states of controllable switch or transistor $Q_s$.

In particular embodiments, compensation signal $V_{comp2}$ can be controlled based on a duration of time or interval of a period or portion (e.g., half) period of AC voltage supply $V_{AC}$. During a first time interval of each such half period, controllable switch $Q_s$ can be turned on to maintain compensation signal $V_{comp2}$ as substantially consistent with operational signal $V_{comp1}$. In this case, charging capacitor $C_{sh}$ can be charged by operational signal $V_{comp1}$. During a remaining time interval of each half period, controllable switch $Q_s$ can be turned off. Thus, compensation signal $V_{comp2}$ can be maintained as a substantially constant value. For example, this substantially constant value compensation signal $V_{comp2}$ can be the value of operational signal $V_{comp1}$ at the end of the first time interval, due to the holding action of charging capacitor $C_{sh}$.

Figure 5:
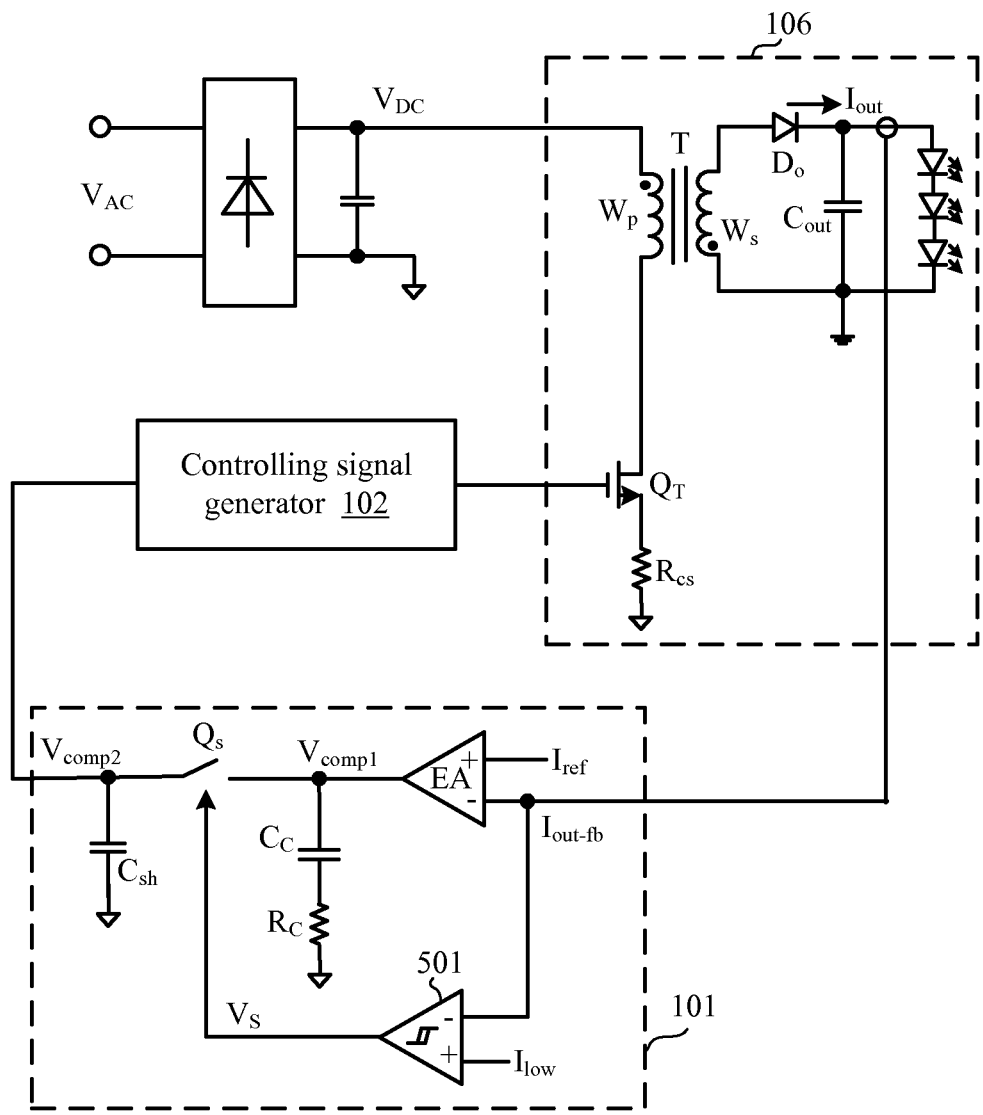
FIG. 5 is a schematic block diagram of an example AC/DC converter employing the controlling circuit of FIG. 2, in accordance with embodiments of the present invention.

Referring now to FIG. 5, shown is a schematic block diagram of an example AC/DC converter employing the controlling circuit of FIG. 2, in accordance with embodiments of the present invention. In this particular example, power stage 106 of the AC/DC converter can be configured as a flyback topology that includes transformer T having primary winding $W_p$ and secondary winding $W_s$, power switch/transistor $Q_T$ coupled in series with primary winding $W_p$, output diode $D_o$ coupled in series with secondary winding $W_s$, and output capacitor $C_{out}$.

Error operation circuit 1011, RC compensation circuit 1012, and sampling and holding circuit 1013 of compensation signal generator 101 can be configured in a similar way as described above. Also, switch controlling circuit 401 of sampling and holding circuit 1013 can include comparator 501. Comparator 501 can receive output signal $I_{out}$ or feedback signal $I_{out-fb}$ representative of output signal $I_{out}$ and reference $I_{low}$, and may be used to generate switch controlling signal $V_S$ at its output.

The non-inverting input of error amplifier EA can receive current reference $I_{ref}$ that represents an expected converter output signal, and the inverting input of error amplifier EA can receive feedback signal $I_{out-fb}$ that represents the output (e.g., current) signal of the AC/DC converter. An error signal can be generated by an error calculation, which can then be compensated to generate operational signal $V_{comp1}$ by RC compensation circuit 1012 (e.g., including resistor $R_C$ and capacitor $C_C$).

Figure 6:
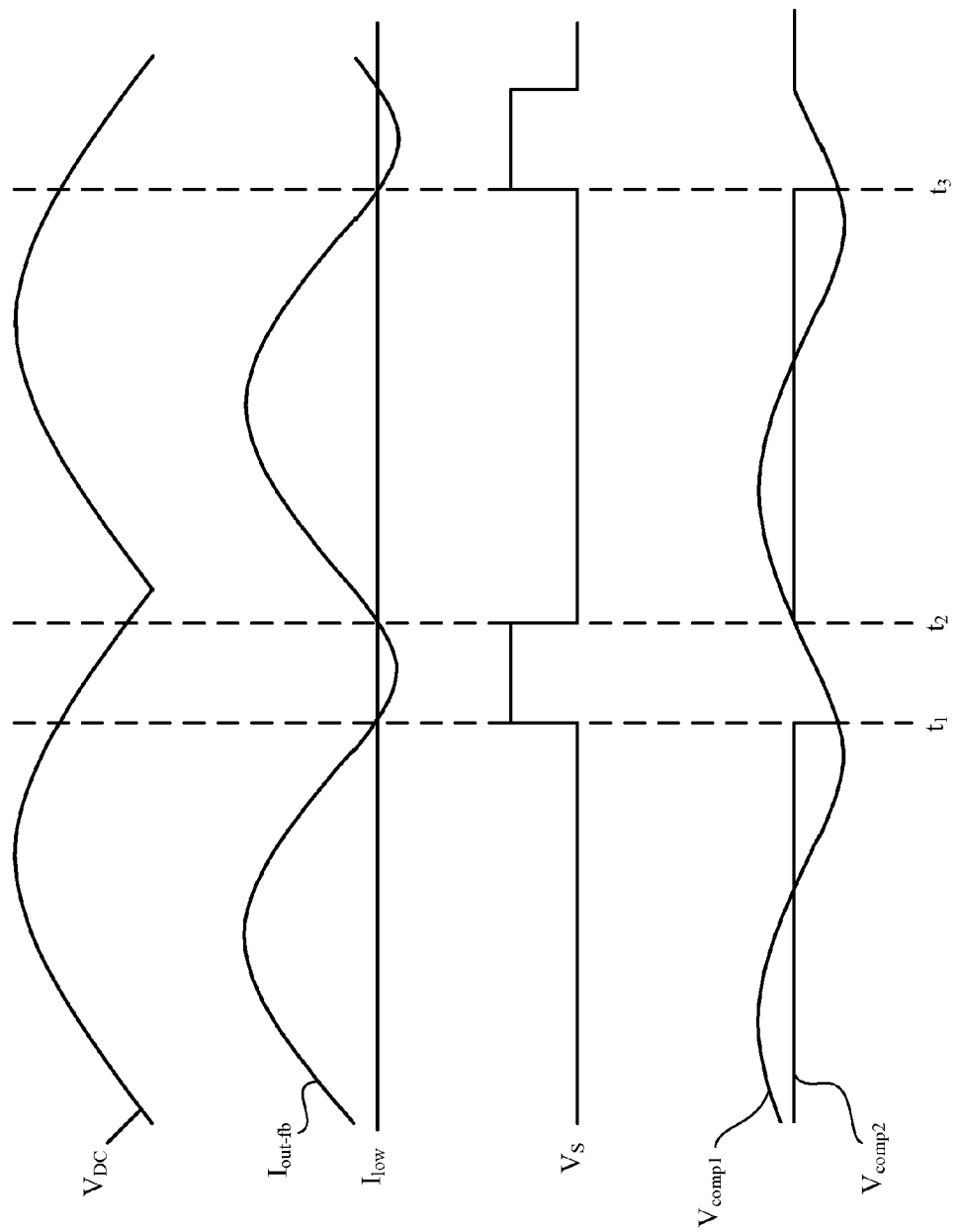
FIG. 6 is a waveform diagram showing example operation of the AC/DC converter of FIG. 5, in accordance with embodiments of the present invention.

Referring now to FIG. 6, shown is a waveform diagram of example operation of the AC/DC converter of FIG. 5, in accordance with embodiments of the present invention. Based on the period or half period of AC voltage supply $V_{AC}$, during the first time interval (e.g., from time $t_1$ to time $t_2$) of the half period (e.g., from time $t_1$ to time $t_3$), feedback signal $I_{out-fb}$ can be lower than reference $I_{low}$. Therefore, switch controlling signal $V_S$ can go high to turn on controllable switch $Q_s$. As a result, during this first time interval, compensation signal $Vc_{comp2}$ can be consistent with and may thus "follow" operational signal $V_{comp1}$.

During the remaining time interval (e.g., from time $t_2$ to time $t_3$) of the half period, feedback signal $I_{out-fb}$ can be higher than reference $I_{low}$. Therefore, switch controlling signal $V_S$ can go high to turn off controllable switch $Q_s$. Thus during this second time interval, compensation signal $V_{comp2}$ can maintain the (substantially constant) value of operational signal $V_{comp1}$ that existed at the end of the first time interval (e.g., when switch controlling signal $V_S$ transitions from high to low in order to turn off controllable switch $Q_s$). This substantially constant value on compensation signal $V_{comp2}$ can be due to the holding action of charging capacitor $C_{sh}$.

Controlling signal generator 102 can be configured to generate controlling signal $V_G$ to control on and off states (e.g., via PWM control) of power switch $Q_T$ in accordance with compensation signal $V_{comp2}$. In this way, the AC/DC converter output signal (e.g., current and/or voltage) can be essentially consistent with an expected converter output signal. Further, the THD can be significantly decreased due to lower fluctuation of compensation signal $V_{comp2}$, which can improve the power factor correction performance of the AC/DC converter. Because the frequency of operational signal $V_{comp1}$ is consistent with DC input voltage $V_{DC}$, switch controlling signal $V_S$ can be related to the period of the AC voltage supply.

One skilled in the art will recognize that other implementations of various circuitry and/or signal control as described herein can be supported in particular embodiments. For example, AC voltage supply $V_{AC}$ or DC input voltage $V_{DC}$ can also be directly employed in the comparison circuitry. In one case, the absolute value of the AC voltage supply can be compared against a reference value by a comparison circuit. For example, when the absolute value of the AC voltage supply is lower than the reference value, controllable switch $Q_s$ can be turned on by switch controlling signal $V_S$, and when the absolute value of the AC voltage supply is higher than the reference value, controllable switch $Q_s$ can be turned off by switch controlling signal $V_S$.

The power stage of the AC/DC converter of particular embodiments can be configured to have an isolated or a non-isolated topology. In fact, any suitable converter topology (e.g., flyback, buck, boost, buck-boost, etc.) can be employed in particular embodiments. In addition, by the sampling control of the error amplifying signal of the controlling circuit for AC/DC converters, both a substantially constant output signal and a substantially decreased THD can be achieved for a higher power factor. Particular embodiments can also support a simplified circuit configuration, better stability, lower costs, and better practicability, of the controlling circuit for AC/DC converters.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. A controlling circuit configured for an AC/DC converter that receives an AC voltage supply, the controlling circuit comprising:
   a) a compensation signal generator configured to generate a compensation signal that is consistent with and follows an error between an output signal from said AC/DC converter and an expected converter output signal during a first time interval of a half period of said AC voltage supply, wherein said output signal is lower than a reference level only during said first time interval;
   b) a charging capacitor configured to maintain said compensation signal as substantially constant at a same value as at the end of said first time interval during a remaining time interval of said half period, wherein said output signal is higher than said reference level only during said remaining time interval; and
   c) a controlling signal generator configured to generate a controlling signal based on said compensation signal to maintain said output signal as substantially consistent with said expected converter output signal.

2. The controlling circuit of claim 1, wherein said compensation signal generator comprises:
   a) an error amplifier configured to generate an error signal to convey said error between said output signal and said expected converter output signal;
   b) an RC compensation circuit configured to compensate said error signal to generate an operational signal; and c) a sampling and holding circuit comprising said charging capacitor, and being configured to generate said compensation signal from said operational signal, wherein said compensation signal is maintained as substantially consistent with said operational signal during said first time interval, and wherein said compensation signal maintains a value of said operational signal at an end of said first time interval during said remaining time interval.

3. The controlling circuit of claim 2, wherein said error amplifier comprises a first input configured to receive said output signal, a second input configured to receive said expected converter output signal, and an output configured as said error signal.

4. The controlling circuit of claim 3, wherein said RC compensation circuit comprises a compensation resistor and a compensation capacitor coupled in series between said output of said error amplifier and ground.

5. The controlling circuit of claim 2, wherein said sampling and holding circuit comprises a controllable switch coupled to said RC compensation circuit, and said charging capacitor coupled to said controllable switch, wherein a voltage across said charging capacitor is configured as said compensation signal.

6. The controlling circuit of claim 5, wherein said sampling and holding circuit further comprises a switch controlling circuit configured to generate a switch controlling signal based on said half period to control said controllable switch.

7. The controlling circuit of claim 6, wherein said switch controlling circuit comprises a comparator configured to receive said output signal and said reference level, wherein:
   a) said controllable switch is controlled to be turned on by said switch controlling signal when said output signal is lower than said reference level; and
   b) said controllable switch is controlled to be turned off by said switch controlling signal when said output signal is higher than said reference level.

8. The controlling circuit of claim 6, wherein said switch controlling circuit comprises a comparator configured to receive an absolute value of said AC voltage supply and said reference level, wherein:
   a) said controllable switch is controlled to be turned on by said switch controlling signal when said absolute value of said AC voltage supply is lower than said reference level; and
   b) said controllable switch is controlled to be turned off by said switch controlling signal when said absolute value of said AC voltage supply is higher than said reference level.

9. An AC/DC converter, comprising:
   a) a controlling circuit that receives an AC voltage supply, the controlling circuit comprising:
      a compensation signal generator configured to generate a compensation signal that is consistent with and follows an error between an output signal from said AC/DC converter and an expected converter output signal during a first time interval of a half period of said AC voltage supply, wherein said output signal is lower than a reference level only during said first time interval,
      a charging capacitor configured to maintain said compensation signal as substantially constant at a same value as at the end of said first time interval during a remaining time interval of said half period, wherein said output signal is higher than said reference level only during said remaining time interval, and
      a controlling signal generator configured to generate a controlling signal based on said compensation signal to maintain said output signal as substantially consistent with said expected converter output signal; and
   b) a power stage configured to receive said controlling signal and a sinusoidal half wave input voltage that is generated by rectifying said AC voltage supply by a rectifier bridge.

10. The AC/DC converter of claim 9, wherein said power stage is configured as an isolated converter topology.

* * * * *